(12) United States Patent
Suzuki

(10) Patent No.: US 7,319,926 B2
(45) Date of Patent: Jan. 15, 2008

(54) SELF-DIAGNOSIS DISPLAY UNIT

(75) Inventor: Masashi Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 609 days.

(21) Appl. No.: 10/501,800

(22) PCT Filed: Jan. 22, 2003

(86) PCT No.: PCT/JP03/00504

§ 371 (c)(1),
(2), (4) Date: Jul. 15, 2004

(87) PCT Pub. No.: WO03/064839

PCT Pub. Date: Aug. 7, 2003

(65) Prior Publication Data

US 2005/0119808 A1    Jun. 2, 2005

(30) Foreign Application Priority Data

Jan. 29, 2002    (JP)    ............................. 2002-019851

(51) Int. Cl.
*G06F 19/00*    (2006.01)

(52) U.S. Cl. ..................... 701/31; 701/107; 340/438

(58) Field of Classification Search ................ 701/29, 701/31, 34, 101, 102, 107; 340/438, 439
See application file for complete search history.

(56) References Cited

U.S. PATENT DOCUMENTS

| | | | | |
|---|---|---|---|---|
| 5,964,813 A | * | 10/1999 | Ishii et al. | .................... 701/35 |
| 6,067,009 A | * | 5/2000 | Hozuka et al. | .............. 340/459 |
| 6,134,488 A | * | 10/2000 | Sasaki et al. | .................. 701/31 |
| 6,449,539 B1 | * | 9/2002 | Ohno et al. | .................... 701/31 |
| 6,477,453 B2 | * | 11/2002 | Oi et al. | ........................ 701/31 |
| 6,553,289 B2 | * | 4/2003 | Maki et al. | .................... 701/29 |
| 7,014,518 B2 | * | 3/2006 | Matsuda et al. | ............... 440/2 |
| 2002/0052678 A1 | * | 5/2002 | Maki et al. | .................... 701/31 |

FOREIGN PATENT DOCUMENTS

| | | |
|---|---|---|
| JP | 59-190478 | 10/1984 |
| JP | 63-57552 | 4/1988 |
| JP | 2001-065395 | 3/2001 |
| JP | 2001-65395 | 3/2001 |

\* cited by examiner

*Primary Examiner*—Gary Chin
(74) *Attorney, Agent, or Firm*—Hogan & Hartson LLP

(57) ABSTRACT

To a self-diagnosis indication system for performing a startup disablement indication when an abnormal condition is self-detected at the time of start up without using on/off signals from a starter switch. There is provided a self-diagnosis indication system for outputting an operation control signal from an ECU by allowing signals from respective types of sensors for detecting an operating condition and a crank pulse signal for detecting a rotation of a crankshaft to enter the ECU and outputting a startup disablement indication signal in a state that an abnormal condition is self-detected at the time of startup, the self-diagnosis indication system being characterized in that a startup disablement indication signal is outputted when a crank pulse signal is inputted in the state that an abnormal condition is self-detected at the time of startup.

2 Claims, 2 Drawing Sheets

SELF-DIAGNOSIS DISPLAY UNIT

TECHNICAL FIELD

The present invention relates to a self diagnosis indication system (a diagnosis indication system) such as provided on automobiles and/or motorcycles.

BACKGROUND ART

The configuration and operation flow of a conventional self-diagnosis indication system is shown in FIG. 2.

As shown in (A) of FIG. 2, detection signals from respective types of sensors for detecting an operating condition of an engine, an on/off signal from a starter switch and a crank pulse signal for detecting the rotation of a crankshaft to thereby calculate an engine rotational speed and a crank angle are inputted into an ECU (engine control unit). The ECU performs operation controls on such as ignition timing and fuel injection based on predetermined programs and maps according to these signals and outputs an abnormality indication signal to illuminate an indication lamp so as to indicate the presence of an abnormal condition when any abnormality is detected which results from disconnection and short circuit. In addition, when an abnormal condition is detected at the time of startup, a startup disablement indication is implemented.

In this startup disablement indicating operation, as shown in (B) of FIG. 2, whether or not the abnormality was detected by a self-diagnosis is determined (step S1), and whether or not the abnormality was detected at the time of startup is determined by judging whether or not the starter switch was switched on when the abnormal condition occurred (step S2), and in the event that it was at the time of startup, then a startup disablement indication is implemented (step S3).

However, with the conventional self-diagnosis indication system, since the startup condition is determined by using on/off signals of the starter switch, the determination means and signal wiring become complex and costs are also increased.

The present invention was intended to deal with the related art and an object thereof is to provide a self-diagnosis indication system for performing a startup disablement indication when an abnormal condition is self-detected at the time of startup without using on/off signals from a starter switch.

DISCLOSURE OF THE INVENTION

With a view to attaining the object, according to the present invention, there is provided a self-diagnosis indication system for outputting an operation control signal from an ECU by allowing signals from respective types of sensors for detecting an operating condition and a crank pulse signal for detecting a rotation of a crankshaft to enter the ECU and outputting a startup disablement indication signal in a state that an abnormal condition is self-detected at the time of startup, the self-diagnosis indication system being characterized in that a startup disablement indication signal is outputted when a crank pulse signal is inputted in the state that an abnormal condition is self-detected.

According to this configuration, in the event that an engine is started up in a state that a certain abnormal condition is self-detected, since the rotation of the engine is detected by the crank pulse signal, that the abnormality is detected at the time of startup can be detected by the input of the crank pulse signal, whereby a startup disablement indication signal can be outputted so as to indicate that a startup is not possible. Thus, a startup disablement indication can be implemented without using on/off signals of the starter switch but with a simple configuration using simple and inexpensive wiring and circuits.

According to a preferred configuration example, the self-diagnosis indication system has an abnormality indicating means for indicating the abnormal condition so self-detected, whereby a startup disablement condition is indicated by changing indication modes of the abnormality indicating means by the startup disablement indication signal.

According to this configuration, an abnormal condition is indicated by illuminating, for example, an indication lamp when the abnormal condition is self-detected, and when a startup is attempted in this abnormal condition, the indication modes of the indication lamp are changed, for example, to cause the indication lamp to flash so as to indicate a startup disablement condition.

MODE FOR CARRYING OUT THE INVENTION

Figure 1:
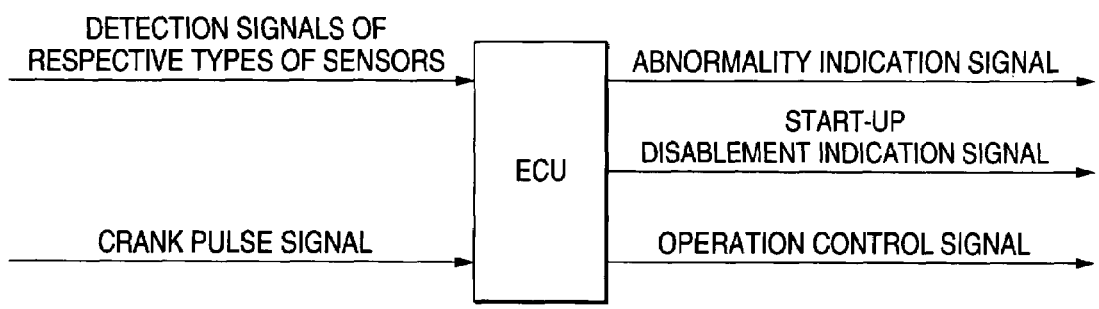
FIG. 1 is explanatory drawings depicting the configuration and operation flow of an embodiment of the present invention.
Figure 1:
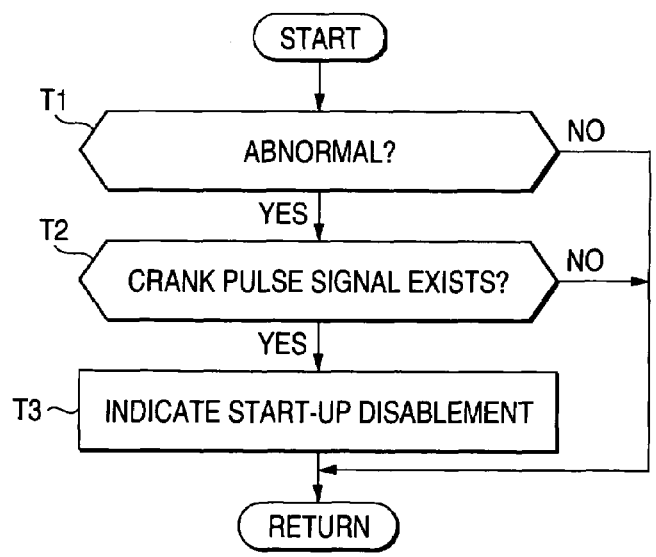
Figure 2:
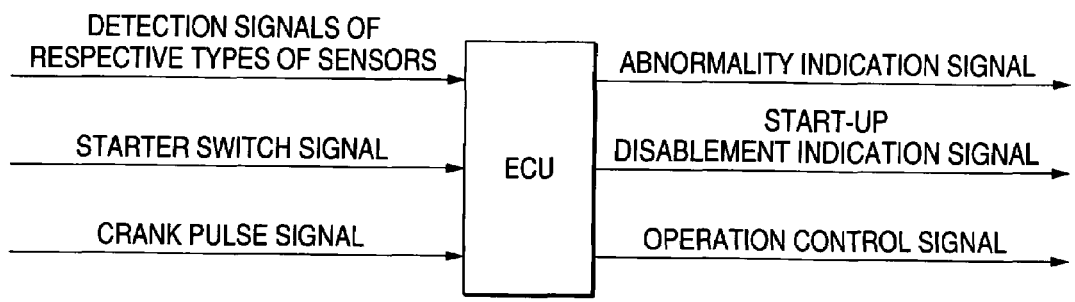
FIG. 2 is explanatory drawings depicting the configuration and operation flow of a conventional abnormality indication system.
Figure 2:
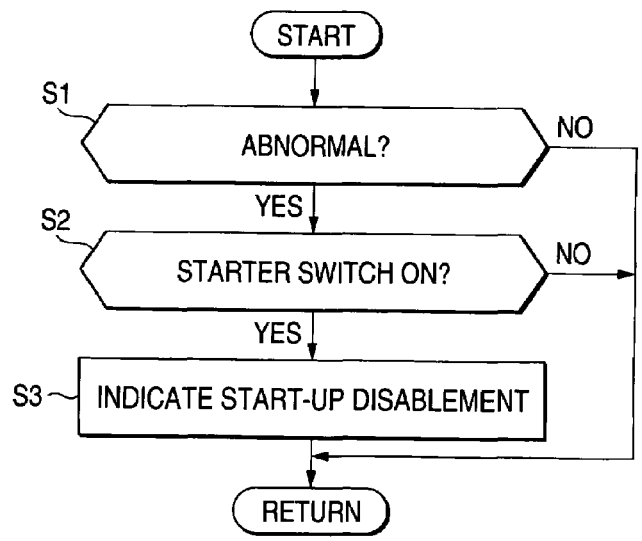

FIG. 1 shows explanatory diagrams depicting the configuration and operation flow of an embodiment of the present invention.

As shown in (A) of FIG. 1, detection signals from respective types of sensors (for example, an intake air pressure sensor, a throttle position sensor, a coolant temperature sensor, an atmospheric pressure sensor, and an intake air temperature sensor) for detecting an operating condition of an engine and a crank pulse signal for detecting the rotation of a crankshaft to thereby calculate an engine rotational speed and a crank angle are inputted into an ECU (engine control unit). The ECU performs operation controls on such as ignition timing and fuel injection based on predetermined programs and maps according to these signals and outputs an abnormality indication signal to illuminate an indication lamp so as to indicate the presence of an abnormal condition when any abnormality is detected which results from disconnection and short circuit. In addition, when an abnormal condition is detected at the time of startup, a startup disablement indication is implemented.

As shown in (B) of FIG. 1, in this flow of startup disablement indicating operation, firstly, whether or not the abnormality was detected by a self-diagnosis is determined (step T1). This is a step for determining whether or not a certain failure such as disconnection or short circuit of the sensors has been detected. If an abnormality is determined in this step T1, an abnormality indication is implemented by illuminating, for example, a red lamp.

Next, whether or not a crank pulse signal exists, that is, an engine is rotating when the abnormality is occurring (when YES in T1) is determined (step T2). Thus, whether or not the engine has been operated to be put in a startup condition is determined. If the engine is in the startup condition (when YES in T2), a startup disablement indication is implemented (step T3). This startup disablement indication can be, for example, a red lamp flashing indication by changing the indication modes of the red lamp. Thus, the user can be aware that the engine is in the operation disablement condition.

INDUSTRIAL APPLICABILITY

As has been described heretofore, in the present invention, in the event that the engine is started up in the state that a certain abnormal condition is self-detected, since the rotation of the engine is detected by the crank pulse signal, that the abnormality is detected at the time of startup can be detected by the input of the crank pulse signal, whereby a startup disablement indication signal can be outputted so as to indicate that a startup is not possible. Thus, a startup disablement indication can be implemented without using on/off signals of the starter switch but with a simple configuration using simple and inexpensive wiring and circuits.

The invention claimed is:

1. A self-diagnosis indication system for outputting an operation control signal from an ECU by allowing signals from respective types of sensors for detecting an operating condition of an engine and a crank pulse signal for detecting a rotation of a crankshaft to enter the ECU and outputting a startup disablement indication signal in a state that an abnormal condition of the engine is self-detected at the time of startup, the self diagnosis indication system being characterized in that;

a startup disablement indication signal is determined when said crank pulse signal is inputted in the state that said abnormal condition is self-detected.

2. A self-diagnosis indication system as set forth in claim 1, having abnormality indicating means for indicating the abnormal condition so self-detected, whereby said startup disablement condition is indicated by changing indication modes of the abnormality indicating means by the startup disablement indication signal.

* * * * *